July 6, 1965  G. MECKLER  3,193,001
COMFORT CONDITIONING SYSTEM
Filed Feb. 5, 1963  3 Sheets-Sheet 1

GERSHON MECKLER  INVENTOR.

BY *Owen & Owen*

ATTYS.

July 6, 1965

G. MECKLER 3,193,001

COMFORT CONDITIONING SYSTEM

Filed Feb. 5, 1963

GERSHON MECKLER INVENTOR.

BY

ATTYS.

United States Patent Office 3,193,001
Patented July 6, 1965

3,193,001
COMFORT CONDITIONING SYSTEM
Gershon Meckler, Toledo, Ohio, assignor, by mesne assignments, to Lithonia Lighting, Inc., a corporation of Georgia
Filed Feb. 5, 1963, Ser. No. 256,421
21 Claims. (Cl. 165—27)

This invention relates to a comfort conditioning system and to a lighting fixture, and, more particularly, to such a system which includes the particular fixture, and is effective to reject heat from the fixture when such heat is not required within a space to be conditioned, and to utilize, when required, at least a part of the heat to prevent an undesirably low space temperature.

It is an object of the invention to provide an improved comfort conditioning system.

It is a further object to provide such a system which includes a particular lighting fixture, and where heat from the fixture is either rejected or utilized to prevent an excessively low space temperature.

It is still another object of the invention to provide an improved lighting fixture.

Other objects and advantages will be apparent from the description which follows, reference being made to the accompanying drawings, in which.

Figure 1:
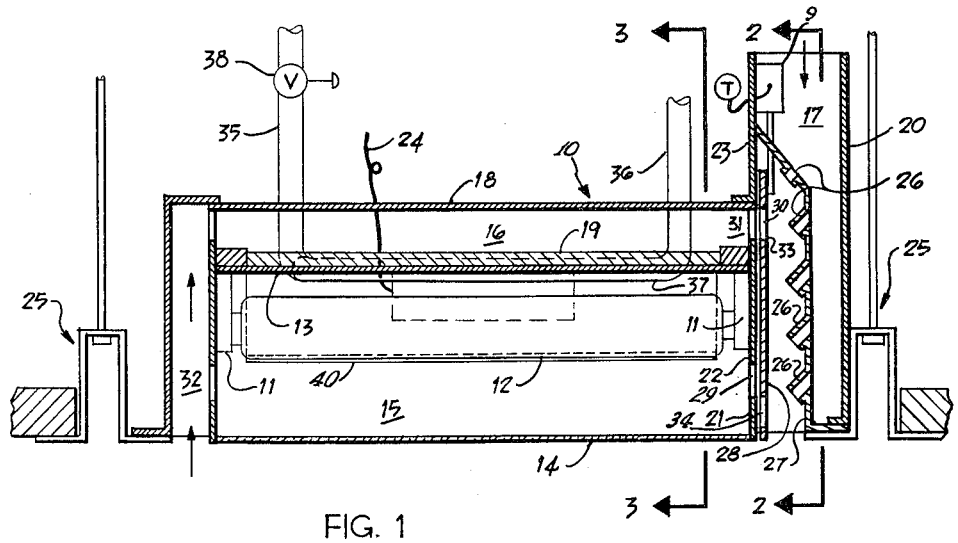
FIG. 1 is a partially schematic vertical sectional view of a lighting fixture according to the invention.

Referring now in more detail to the drawings, and, in particular, to FIG. 1, a lighting fixture according to the invention is indicated generally at 10. The fixture 10 comprises end supports 11 for a lamp 12, which is shown as a fluorescent type, a reflector 13 disposed above the light 12, a light diffusing panel 14 disposed below the light 12, and various wall means defining, either alone, or in combination with various previously identified portions of the fixture, a first passage 15 for circulation of air, a second passage 16 for circulation of air, and a third passage 17.

The first passage 15 is enclosed by the undersurface of the reflector 13, the upper surface of the diffuser 14, and edge panels (not illustrated in FIG. 1) of the fixture 10. Air circulated through the first passage 15 is in direct thermal contact with both the lamp 12 and the undersurface of the reflector 13. The second passage 16 is enclosed by an upper wall 18 of the fixture 10, the upper surface of the reflector 13, and front and rear walls (not illustrated in FIG. 1) of the fixture 10. Air circulated through the passage 16 is not in thermal contact with the lamp 12, and is at least partially isolated, thermally, from the upper surface of the reflector 13 by insulation 19, which can be of any suitable type. In the specific fixture shown in FIG. 1, the first and second passages, 15 and 16, extend generally longitudinally of the light source 12, while the third passage 17 extends laterally thereof. The third passage 17 is enclosed by an end wall 20, lower, intermediate and upper end walls 21, 22 and 23 of the fixture 10, and by front and rear walls thereof (not illustrated in FIG. 1).

The light fixture 10 also includes wire means 24 for energizing the light source 12, and hanger means indicated generally at 25 for mounting the fixture 10 in a building structure.

In service, suitably conditioned air is supplied to the third passage 17 of the lighting fixture 10 from an appropriate duct (not illustrated in FIG. 1) as indicated by the arrow. The conditioned air, in passing downwardly through the third passage 17, is directed through nozzle means 26 carried by a plate member 27. This so directs the flow of the conditioned air, that it tends to induce a flow from left to right through each of the first and second passages, 15 and 16. However, the lighting fixture 10 also includes a damper 28, operated by a suitable motor 9 controlled by space thermostat T, which damper is vertically slidably mounted, and is shown in FIG. 1 at the lowest extent of its vertical movement. In this position, it effectively prevents air flow through the first passage 15, by blocking an opening 29 between the lower intermediate end wall 21 and the central intermediate end wall 22, through which opening communication would otherwise be possible from the first passage 15 to the third passage 17. In the damper position shown in FIG. 1, an opening 30 therein is aligned with an opening 31 between the central intermediate end wall 22 and the upper intermediate end wall 23 of the fixture 10, so that communication is possible from the second passage 16 through the openings 31 and 30 to the third passage 17. In this damper position, downward flow of conditioned air through the third passage 17 induces a recirculation of air from the space to be conditioned, which is below the diffusing panel 14, upwardly through a passage 32, as indicated by the arrows, from left to right through the second passage 16 and the openings 31 and 30 and into the third passage 17. In the third passage 17 the circulated air from the space is mixed with conditioned air and returned to the space. As has been indicated above, the second passage 16 is effectively insulated relative to the reflector 13, and air circulated therethrough is not in contact with the light source 12. As a consequence, when the damper 28 is in the position shown in FIG. 1, the delivery of conditioned air through the third passage 17 to the space to be conditioned induces a recirculation of air from the space through the passages 32 and 16, but without appreciable heating from the fixture 10 of the recirculated air. This damper position is used when the thermal load instantaneously imposed upon the space is sufficiently high that maximum cooling is required.

When the load upon the space to be conditioned falls below one requiring maximum cooling, the damper 28 is re-positioned, being moved upwardly from the position shown in FIG. 1, so that heat generated by the light source 12 is supplied to the space as instantaneously required. When maximum heat is required, the damper 28 is moved by the motor 9 to the upper limit of its vertical travel. In this position, an edge 33 of the damper 28 is aligned with the wall 18 of the lighting fixture 10, so that the damper 28 effectively prevents air flow from the second passage 16 into the third passage 17. In this position of the damper 28, a lower opening 34 therein is aligned with the opening 29, so that air flow is enabled from the first passage 15 through the aligned openings 29 and 34, and into the third passage 17. The downward flow of conditioned air through the third passage 17, in the indicated position for the damper 28, induces maximum air flow through the first passage 15. Maximum air flow through the first passage 15 causes maximum heat transfer from the light source 12 and the lower surface of the reflector 13 to the air flowing through the first passage 15, and, consequently, a maximum temperature for the combined recirculated air and conditioned air delivered to the space from the lower extremity of the third passage 17.

In the specific embodiment of the lighting fixture 10 illustrated in FIG. 1, the openings 30 and 34 in the damper 28 are of equal size, and are so positioned that any vertical movement of the damper 28 upwardly from the position shown in FIG. 1 causes a blocking of a given percentage of the opening 31 and a corresponding unblocking of the same percentage of the opening 29. The openings 29 and 31 are also equally sized, so that, regardless of the position of the damper 28 between the upper and lower limits, as discussed above, a given rate of conditioned air flow through the third passage 17 induces the same upward flow of recirculated air through the passage 32, and the total air delivered to the space to be conditioned through the lower extremity of the third passage 17 remains constant. However, the temperature of such air varies depending upon the vertical position of the damper 28. In the position shown in FIG. 1, the damper 28 minimizes heating of the recirculated air. In its uppermost position, the damper 28 enables maximum heating of the recirculated air. At intermediate positions for the damper 28, intermediate heating of the recirculated air is achieved.

Figure 3:
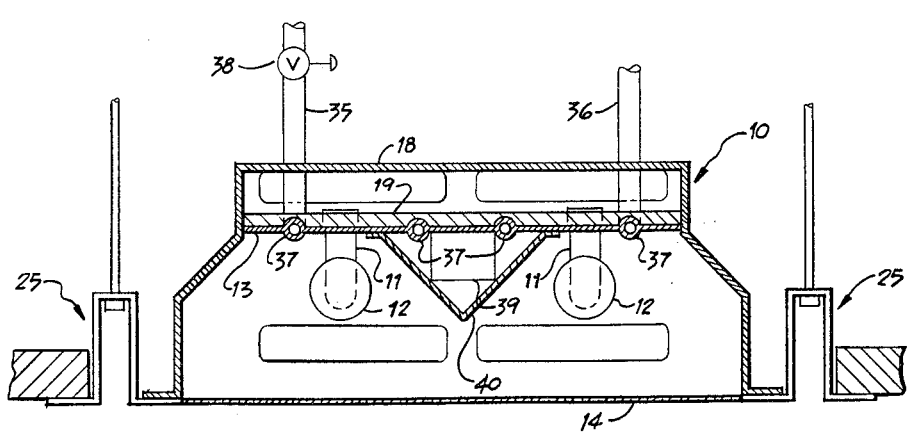
FIG. 3 is a vertical sectional view generally along the line 3—3 of FIG. 1.
Figure 2:
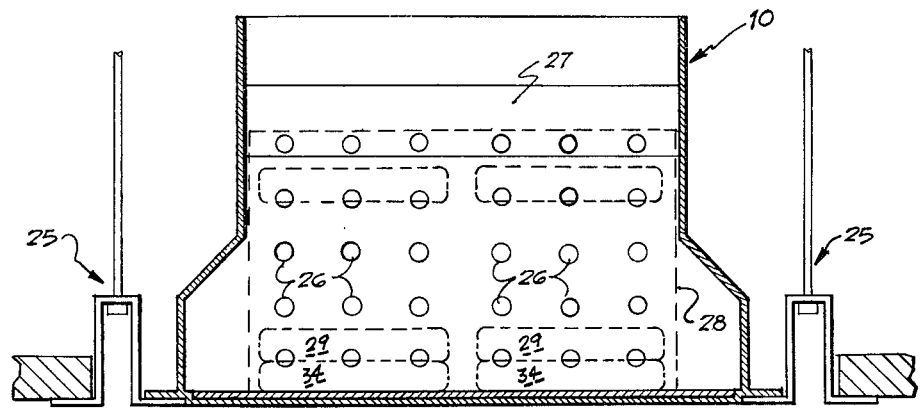
FIG. 2 is a view in vertical section generally along the line 2—2 of FIG. 1, and showing details of a damper structure which is an essential part of the lighting fixture of FIG. 1.

The lighting fixture 10 also includes a conduit 35 for delivering cooling water for heat transfer with the reflector 13, and a conduit 36 for returning such water. As can be seen in FIG. 3, the cooling water delivered by the conduit 35 enters a conduit system comprising passages 37 which are in thermal contact with the reflector 13. The cooling water travels through the passages 37 and to the return conduit 36. The reflector 13 shown in the drawings is a one-piece cast structure having passages 37 formed within as shown in FIG. 3. The reflector may also be a two-piece structure wherein approximately one-half of each of the passages 37 is suitably formed in one of the pieces, in alignment with the other half thereof which is likewise suitably formed in the other piece thereof. Thereafter, the complete reflector 13 is formed by suitably bonding the two shaped parts relative to one another. Such reflectors are particularly advantageous because of the excellent heat transfer that is achieved between water or another cooling fluid circulated through the passages 37 and the metal part of the reflector 13. However, other types of reflectors can also be used, for example where separate passages of any suitable metal are welded, soldered, or otherwise suitably attached to the reflector. A valve 38 is also shown in the conduit 35, and can advantageously be used, particularly when ambient air at a relatively low temperature is available, to throttle the flow of water or other heat transfer fluid through the passages 37, thereby minimizing to a required extent the transfer of heat from the reflector 13 to the water or other heat transfer fluid in the passages 37, and enabling a maximum heating of air flowing through the first passage 15.

The lighting fixture 10 also includes a usual ballast 39, which, in the specific embodiment shown, is enclosed within a central downwardly extending V member 40, which is welded or otherwise attached to the reflector 13, so that heat from the ballast 39 is also absorbed by the reflector 13 for dissipation by means of water or another heat transfer fluid circulated through the passages 37, when desired, or for transfer to air circulated through the first passage 15, and ultimately returned to the space.

The diffuser 14 can be any known type of material which is effective to transmit and diffuse visible light, but reflect radiant heat energy. A specific example of such a material is disclosed in detail in U.S. Patent 2,564,708.

Figure 4:
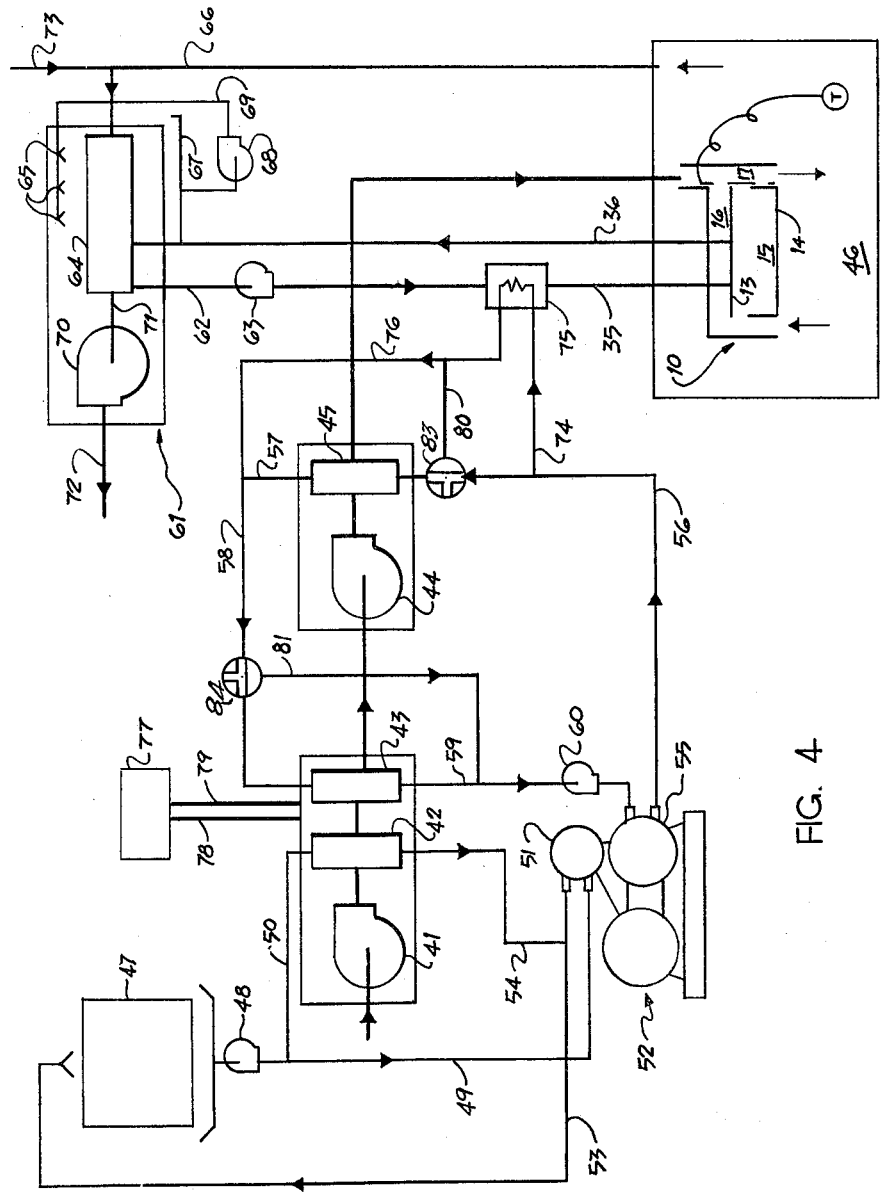
FIG. 4 is a schematic line diagram showing the comfort conditioning system according to the invention, and including the lighting fixture of FIG. 1.

The comfort conditioning system according to the invention, including the lighting fixture 10, is shown schematically in FIG. 4. The system includes a blower 41 for circulating fresh or ambient air through a first dehumidifier 42, which, in the specific embodiment shown, is a dehumidifier which employs a desiccant, particularly a liquid desiccant such as a lithium chloride solution or an ethylene glycol solution, a second dehumidifier 43, which is similarly represented, and to a second blower 44 which delivers the dehumidified air to a sensible cooling coil 45, and from thence to the third passage 17 of the lighting fixture 10. The conditioned air, after mixing with recirculated air, as described above, is delivered from the third passage 17 to the space to be conditioned, which is designated 46.

In the specific system shown in FIG. 4, water from a cooling tower 47 is circulated by a pump 48 through a line 49, and in parallel therewith through a line 50. Water in the line 49 is delivered to a condenser 51 of a conventional compressor-condenser-evaporator refrigerating apparatus indicated generally at 52, and is turned from the condenser 51 through a line 53 to the cooling tower 47. Water in the line 50 is delivered to the first stage dehumidifier 42 for indirect heat exchange with the desiccant thereof and returned through a line 54 to the line 53, and, ultimately, to the cooling tower 47.

An evaporator 55 of the refrigeration apparatus 52 chills water for delivery through a line 56 to the sensible cooling coil 45, and from thence through lines 57 and 58 to the second stage chemical dehumidifier 43. The chilled water from the line 58 is ordinarily employed for indirect heat exchange with desiccant within the dehumidifier 43, and is then returned through a line 59 and a pump 60 to the evaporator 55.

Water for circulation through the passages 37 of the lighting fixture 10 is supplied by an evaporative cooler indicated generally at 61. Water from the evaporative cooler 61 is circulated through a line 62 by a pump 63, and is delivered thereby to the conduit 35. Return water from the lighting fixture 10 is returned by the conduit 36 to the evaporative cooler 61. As specifically shown in FIG. 4, water returned to the evaporative cooler 61 through the conduit 36 enters an indirect heat exchanger 64, passes therethrough, and then is returned to the line 62. In the indirect heat exchanger 64, water from the conduit 36 is cooled as a consequence of the evaporation of water sprayed thereinto from nozzles 65, in direct heat exchange relationship with relief air from the space 46 delivered to the indirect exchanger 64 through a line 66. Water from the sprays 65 is evaporated by the relatively dry relief air, causing substantial cooling, and liquid water which passes through the indirect heat exchanger 64 is collected in a pan 67 and recirculated, together with makeup water from any suitable source (not illustrated) by a pump 68 through a line 69 to the nozzles 65. Relief air from the indirect heat exchanger 64 and water vapor are discharged from the evaporative cooler 61 by a blower 70, through a duct 71, and to a duct 72, which discharges the relief air and water vapor to the outside. Under some conditions of operation it may be desirable to supplement the relief air delivered to the indirect heat exchanger 64 through the duct 66 with ambient air. This can be accomplished in the system of FIG. 4 by introducing ambient air into the exchanger 64 through a duct 73, as required.

Under extreme conditions of operation, it may be desirable to provide chilled water to the lighting fixture 10, through the conduit 35, at a temperature lower than can be achieved by means of the evaporative cooler 61, operating either on relief air, or on relief air supplemented by ambient air. This can be accomplished in the system of FIG. 4 by diverting chilled water from the line 56 through a line 74 to an indirect heat exchanger 75 for indirect heat exchange with water from the evaporative cooler 61 delivered to the conduit 35. Chilled water from the indirect heat exchanger 75 is returned through a line 76 to the line 58, for ultimate return to the evaporator 55, as previously described.

As has been indicated above, the first and second stage dehumidifiers 42 and 43 are conventionally represented as of the chemical type employing a liquid desiccant. A regenerator 77 is also shown to maintain a required desiccant concentration. Relatively dilute desiccant from the dehumidifiers 42 and 43 is delivered to the regenerator 77 through a line 78, and concentrated desiccant is returned to the dehumidifiers 42 and 43 through a line 79.

The system of FIG. 4 is particularly advantageous for use in multi-story buildings. In such a building there would ordinarily be a plurality of spaces 46 to be conditioned, and on each of a plurality of floors. Since the primary device for dissipating heat from the lighting fixture 10 is the evaporative cooler 61, and since the evaporative cooler 61 is sensibly cooled by evaporation of water or another evaporative liquid in direct heat exchange with relief air from the duct 66, or with relief air from the duct 66 supplemented by ambient air from the duct 73, an evaporative cooler 61 can reasonably be supplied for each floor of a multi-story building, or for each of a relatively small group of floors of a multi-story building. The other components of the system, i.e., the cooling tower 47, the first and second stages of dehumidification, 42 and 43, the sensible cooling coil 45, and the refrigeration apparatus 52 would ordinarily be made to serve the entire multi-story building. All of these other components except the cooling tower 47 might reasonably be situated in an equipment room, and the cooling tower 47 might well be on top of the building. Under most conditions of operation the cooling available by utilization of the evaporative cooler 61 for each floor, or for each of a relatively small group of floors, would be sufficient to dissipate the heat generated by the lighting fixtures 10. However, the system provides for supplementing the evaporative cooler 61 by utilization of the indirect heat exchangers 75. Even in an extremely high building, this does not necessitate high pressures in the evaporative cooler 61 circuit, including the conduits 35 and 36, and the chambers 37.

While the four separate heat transfer devices shown in FIG. 4, namely the first and second stages of chemical dehumidification, 42 and 43, the sensible cooling coil 45, and the lighting fixture 10, constitute the components of a particularly advantageously system according to the invention, many of the advantages thereof can be achieved in a system from which one or more of these components are excluded. For example, the sensible load that is preferably carried by the cooling coil 45 can be imposed upon the first and second stages of chemical dehumidification, 42 and 43, and the coil 45 can then be eliminated. In the system shown in FIG. 4, the coil 45 can be eliminated as a heat transfer device merely by by-passing chilled water from the line 56 through a by-pass valve 83 and, a line 80 to the line 76, and ultimately back to the evaporator 55, as previously described. When this is done, it is necessary to operate the first and second stages of chemical dehumidification to accomplish more effective sensible cooling, for example by higher rates of heat transfer fluid flow through each, or by delivering to each, and particularly to the second stage of chemical dehumidification 43, a heat transfer fluid at a lower temperature, or by both expedients.

The use of two stages of chemical dehumidification is also particularly advantageous, especially when heat from the first stage 42 is dissipated to the cooling tower 47. Such arrangement enables the dissipation of a substantial portion of the latent load on the comfort conditioning system without the necessity for the consumption of refrigeration capacity, for example from the refrigeration apparatus 52. It is not possible, however, to carry the entire latent load on cooling tower water, and still to circulate only the minimum air required for ventilation purposes. Accordingly, the second stage of chemical dehumidification 43, and preferably cooled by chilled water, or at a temperature lower than that of the first stage 42, is advantageous. However, many of the advantages of the system of FIG. 4 can be accomplished even if the first stage 42 of chemical dehumidification is eliminated, so that all of the sensible and latent load imposed by the instantaneous ambient conditions is carried by refrigeration, and, specifically, by the second stage 43 of chemical dehumidification cooled by chilled water from the line 58 at quite a low temperature, e.g. in the vicinity of 50° F. Alternatively, many of the advantages can be realized by carrying a substantial portion of the latent load by the first stage 42 of chemical dehumidification, still operated on cooling tower water, and by carrying the remainder of the latent load, and substantially all of the sensible load by the coil 45. To this end, a by-pass valve 84 and a by-pass 81 is shown in FIG. 4 around the second stage 43 of chemical dehumidification.

The various valves, and controls therefor, and dampers, and controls therefor, which would be required to accomplish the various alternate methods of operation of the system of FIG. 4 which have been described will be apparent to one skilled in the art, and, therefore, in the interests of simplicity, have not been represented. It will also be apparent that the invention provides a dynamically integrated lighting, heating, cooling fixture and system which, in its preferred embodiments, removes a substantial heat load by non-refrigerated means, and simultaneously controls the temperature of the space with direct heat from a lighting system. Various changes and modifications can be made from the specific details set forth herein and disclosed in the attached drawings without departing from the spirit and scope of the invention as defined in the appended claims.

What I claim is:

1. An apparatus for comfort conditioning of an enclosed space, comprising, in combination, a first dehumidifier, a second dehumidifier, a cooler, a lighting fixture, said fixture including a closure member, a reflector having integral passage means for circulation of a first heat transfer fluid therethrough, a light diffuser in spaced relationship to said reflector, means for mounting a light source within said closure member between said reflector and diffuser, whereby said diffuser will transmit and diffuse light incident thereon and will reflect radiant heat energy towards said reflector, a first air flow passage within said fixture for circulation of air from said space through said fixture in thermal contact with said light source, a second air flow passage within said fixture for circulation of air from said space through said fixture but out of thermal contact with said light source, a third air flow passage within said fixture connected to said first and second passages whereby air flow through said third passage into said space will induce air circulation from said space, through said first and second passages, and hence into said third passage, and a damper for regulation of the relative amounts of air flow through said first and second passages, means for circulating air through said first and second dehumidifiers and said third passage to said space, means for exhausting air from said space, through said cooler and venting outside said space, means for circulating a second fluid through said cooler in direct heat exchange relationship with said exhausted air from said space, and means for circulating said first heat transfer fluid from said passage means of said reflector through said cooler whereby said first heat transfer fluid is cooled by said exhausted air and said second fluid, and means for circulating a third heat transfer fluid through said first and second dehumidifiers to absorb energy therefrom.

2. An apparatus for comfort conditioning of an enclosed space, comprising, in combination, a first dehumidifier, a second dehumidifier, a cooler, a lighting fixture, said fixture including a closure member, a reflector having integral passage means for circulation of a heat transfer fluid therethrough, a light diffuser in spaced relationship to said reflector, means for mounting a light source within said closure member between said reflector and diffuser, whereby said diffuser will transmit and diffuse light incident thereon and will deflect radiant heat energy towards said reflector, a first air flow passage within said fixture for circulation of air from said space through said fixture in thermal contact with said light source, a second air flow passage within said fixture for circulation of air from said space through said fixture but out of thermal contact with said light source, a third air flow passage within said fixture connected to said first and second passages whereby air flow through said third passage into said space will induce air circulation from said space, through said first and second passages, and hence into said third passage, and a damper for regulation of the relative amounts of air flow through said first and second passages, means for circulating air through said first and second dehumidifiers and said third passage to said space, and means for circulating a heat transfer fluid to said passage means in said reflector and to said first and second dehumidifiers whereby energy is absorbed therefrom.

3. A lighting fixture comprising, in combination, an outer closure member, a reflector having integral passage means for circulation of a first heat transfer fluid therethrough, a light diffuser in spaced relationship to said reflector, means for mounting a light source within said closure member between said reflector and said diffuser, whereby said diffuser will transmit and diffuse light incident thereon and will reflect radiant heat energy towards said reflector, a first air flow passage within said fixture for circulation of air from said space through said fixture in thermal contact with said light source, a second air flow passage within said fixture for circulation of air from said space through said fixture but out of thermal contact with said light source, a third air flow passage within said fixture connected to said first and second passages whereby air flow through said third passage into said space will induce air circulation from said space, through said first and second passages, and hence into said third passage, and a damper for regulation of the relative amounts of air flow through said first and second passages.

4. A lighting fixture comprising, in combination, an outer closure member, a reflector having integral passage means for circulation of a first heat transfer fluid therethrough, a light diffuser in spaced relationship to said reflector, means for mounting a light source within said closure member between said reflector and said diffuser, whereby said diffuser will transmit and diffuse light incident thereon and will reflect radiant heat energy towards said reflector, a first air flow passage within said fixture for circulation of air from said space through said fixture in thermal contact with said light source, a second air flow passage within said fixture for circulation of air from said space through said fixture but out of thermal contact with said light source, a third air flow passage within said fixture connected to said first and second passages and exhausting into said space, means in said third passage for causing air to flow through said first and second passages through said third passage and into said space, and a damper for regulation of the relative amounts of air flow through said first and second passages.

5. A lighting fixture comprising, in combination, an outer closure member, a reflector having integral passage means for circulation of a first heat transfer fluid therethrough, a light diffuser in spaced relationship to said reflector, means for mounting a light source within said closure member between said reflector and said diffuser, whereby said diffuser will transmit and diffuse light incident thereon and will reflect radiant heat energy towards said reflector, a first air flow passage within said fixture for circulation of air from said space through said fixture in thermal contact with said light source, a second air flow passage within said fixture for circulation of air from said space through said fixture but out of thermal contact with said light source, a third air flow passage within said fixture connected to said first and second passages and exhausting into said space, means effective to cause a flow of air from said space through said first and second passages and hence into said third passage, and a damper for regulation of the relative amounts of air flow through said first and second passages.

6. An apparatus for comfort conditioning of an enclosed space, comprising, in combination, a first dehumidifier, a second dehumidifier, a cooler, a lighting fixture, said fixture including a closure member, a reflector having integral passage means for circulation of a first heat transfer fluid therethrough, a light diffuser in spaced relationship to said reflector, means for mounting a light source within said closure member between said reflector and diffuser, whereby said diffuser will transmit and diffuse light incident thereon and will reflect radiant heat energy towards said reflector, a first air flow passage within said fixture for circulation of air from said space through said fixture in thermal contact with said light source, a second air flow passage within said fixture for circulation of air from said space through said fixture but out of thermal contact with said light source, a third air flow passage within said fixture connected to said first and second passages whereby air flow through said third passage into said space will induce air circulation from said space, through said first and second passages, and hence into said third passage, and a damper for regulation of the relative amounts of air flow through said first and second passages, means for circulating air through said first and second dehumidifiers and said third passage to said space, means for exhausting air from said space, through said cooler and venting outside said space, means for circulating a second fluid through said cooler in direct heat exchange relationship with said exhausted air from said space, means for circulating said first heat transfer fluid from said passage means of said reflector through said cooler whereby said first heat transfer fluid is cooled by said exhausted air and said second fluid, means for circulating a third heat transfer fluid through said second dehumidifier to absorb energy therefrom at a temperature below a predetermined level and means for circulating a heat transfer fluid through said first dehumidifier to absorb energy therefrom at a temperature level above said predetermined level.

7. Apparatus as claimed in claim 6 including means for circulating a heat transfer fluid effective to absorb energy from the first heat transfer fluid circulated through said passage means in said reflector.

8. Apparatus as claimed in claim 6 including a motor operatively connected with said damper for positioning thereof.

9. Apparatus as claimed in claim 8, and control means responsive to the temperature within said space and effective to position said damper (1) to increase air flow through said first passage of said lighting fixture in response to a space temperature below a predetermined level, and (2) to increase air flow through said second passage of said lighting fixture in response to a space temperature above said predetermined level.

10. An apparatus for comfort conditioning of an enclosed space, comprising, in combination, a dehumidifier, a cooler, a lighting fixture, said fixture including a closure member, a reflector having integral passage means for circulation of a first heat transfer fluid therethrough, a light diffuser in spaced relationship to said reflector, means for mounting a light source within said closure member between said reflector and diffuser, whereby said diffuser will transmit and diffuse light incident thereon and will reflect radiant heat energy towards said reflector, a first air flow passage within said fixture for circulation of air from said space through said fixture in thermal contact with said light source, a second air flow passage within said fixture for circulation of air from said space through said fixture but out of thermal contact with said light source, a third air flow passage within said fixture connected to said first and second passages and exhausting into said space, means effective to cause a flow of air through said first and second passages and hence into said third passage, and a damper for regulation of the relative amounts of air flow through said first and second passages, means for circulating air through said dehumidifier and said third passage to said space, means for circulating a second fluid from said passage means in said reflector to said cooler for absorption of heat therefrom.

11. An apparatus for comfort conditioning of an enclosed space, comprising, in combination, a dehumidifier, a cooling coil for sensible cooling of air circulated in contact therewith, a lighting fixture, said fixture including a closure member, a reflector having integral passage means for circulation of a first heat transfer fluid therethrough, a light diffuser in spaced relationship to said reflector, means for mounting a light source within said closure member between said reflector and diffuser, whereby said diffuser will transmit and diffuse light incident thereon and will reflect radiant heat energy towards said reflector, a first air flow passage within said fixture for circulation of air from said space through said fixture in thermal contact with said light source, a second air flow passage within said fixture for circulation of air from said space through said fixture but out of thermal contact with said light source, a third air flow passage within said fixture connected to said first and second passages, means effective to cause air flow through said first and second passages and hence into said third passage, and a damper for regulation of the relative amounts of air flow through said first and second passages, means for circulating air through said dehumidifier and said cooling coil and said third passage to said space, a cooler and means for circulating said first heat transfer fluid from said passage means of said reflector to said cooler and for returning cooled heat transfer fluid to said passage means in said reflector, and means for circulating a heat transfer fluid to said cooling coil to absorb energy therefrom.

12. Apparatus as claimed in claim 11 including means effective to absorb energy from said cooled heat transfer fluid circulated from said cooler.

13. Apparatus as claimed in claim 11 and including an air duct for delivering outside air to said cooler in heat exchange relationship with said heat transfer fluid therein.

14. Apparatus for comfort conditioning of a closed space comprising, in combination, an air supply conduit having a terminal air mixing portion which discharges into said closed space, at least one light fixture having an enclosed chamber and a light transmitting wall portion forming a surface in said closed space, means in said enclosed chamber for converting electrical energy into heat and light and effective to heat said enclosed chamber, means for circulating air from said closed space into said enclosed chamber to cool said enclosed chamber and to provide a supply of air that is at a temperature above the temperature of the air in said closed space, means for mixing air heated in said enclosed chamber with air from said supply conduit in said terminal air mixing portion of said supply conduit, and means for varying the rate of flow of air from said closed space through said enclosed chamber.

15. Apparatus for comfort conditioning of a closed space comprising, in combination, an air supply conduit having an air mixing portion which discharges into said closed space, at least one light fixture having an enclosed chamber and a light transmitting wall portion forming a surface in said closed space, means in said enclosed chamber for converting electrical energy into heat and light and effective to heat said enclosed chamber, a first means for circulating air from said closed space through said enclosed chamber and for mixing such circulated air with air in the air mixing portion of said supply conduit, a second means for circulating air from said closed space, by-passing said enclosed chamber, and for mixing such circulated air with air in the air mixing portion of said supply conduit, and control means for proportioning the flow of air through said first and second means.

16. The apparatus of claim 15 wherein said control means is responsive to the temperature in said closed space.

17. Apparatus for comfort conditioning of a closed space comprising, in combination, an air supply conduit which discharges into said closed space, inlet means in a portion of said supply conduit whereby air flow in said supply conduit will induce a secondary flow of air from said inlet means for mixture therewith, at least one light fixture having an enclosed chamber and a light transmitting wall portion forming a surface in said closed space, means in said enclosed chamber for converting electrical energy into heat and light and effective to heat said enclosed chamber, a first passage means for circulating air from said closed space through said enclosed chamber and to said inlet means, a second passage means for circulating air from said closed space by-passing said enclosed chamber, and to said inlet means, and means for controlling the air flow through said first and second passage means in response to the temperature in said closed space.

18. Apparatus as claimed in claim 15 wherein said enclosed chamber includes a reflector for reflecting light from said electrical converting means toward said light transmitting wall portion, and said reflector has integral passages for circulation of a heat transfer fluid therethrough, and including means for circulating a heat transfer fluid through the passages of said reflector.

19. Apparatus as claimed in claim 18, and including means for varying the temperature of a heat transfer fluid circulated through the passages of said reflector.

20. Apparatus as claimed in claim 18, and including an evaporative cooler for absorbing heat from a heat transfer fluid circulated through the passages of said reflector.

21. Apparatus as claimed in claim 20, and means for circulating low temperature conditioned air to said closed space.

References Cited by the Examiner

UNITED STATES PATENTS

| | | | |
|---|---|---|---|
| 2,564,334 | 8/51 | Kennedy | 98—40 X |
| 3,010,378 | 11/61 | Geocaris | 98—33 |
| 3,065,686 | 11/62 | Geocaris | 98—40 |
| 3,090,434 | 5/63 | Benson et al. | 165—50 |

JAMES W. WESTHAVER, *Primary Examiner.*

UNITED STATES PATENT OFFICE
CERTIFICATE OF CORRECTION

Patent No. 3,193,001                                                       July 6, 1965

Gershon Meckler

It is hereby certified that error appears in the above numbered patent requiring correction and that the said Letters Patent should read as corrected below.

Column 9, line 1, after "space" insert -- and --; same line 1, strike out "a second", and insert instead -- said --.

Signed and sealed this 28th day of December 1965.

(SEAL)
Attest:

ERNEST W. SWIDER                                             EDWARD J. BRENNER
Attesting Officer                                                      Commissioner of Patents